United States Patent
Ding et al.

(10) Patent No.: US 12,556,733 B2
(45) Date of Patent: Feb. 17, 2026

(54) EFFICIENT NEURAL NETWORK DECODER FOR IMAGE COMPRESSION

(71) Applicant: Tencent America LLC, Palo Alto, CA (US)

(72) Inventors: Ding Ding, Palo Alto, CA (US); Xiaozhong Xu, Palo Alto, CA (US); Shan Liu, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/639,613

(22) Filed: Apr. 18, 2024

(65) Prior Publication Data
US 2024/0357145 A1 Oct. 24, 2024

Related U.S. Application Data

(60) Provisional application No. 63/460,889, filed on Apr. 20, 2023.

(51) Int. Cl.
*H04N 19/44* (2014.01)
*H04N 19/132* (2014.01)
*H04N 19/186* (2014.01)
*H04N 19/30* (2014.01)

(52) U.S. Cl.
CPC ........... *H04N 19/44* (2014.11); *H04N 19/132* (2014.11); *H04N 19/186* (2014.11); *H04N 19/30* (2014.11)

(58) Field of Classification Search
CPC .... H04N 19/44; H04N 19/132; H04N 19/186; H04N 19/30
See application file for complete search history.

(56) References Cited

U.S. PATENT DOCUMENTS

| | | | |
|---|---|---|---|
| 2019/0297326 A1* | 9/2019 | Reda | G06T 5/20 |
| 2022/0270207 A1 | 8/2022 | Chen | |
| 2023/0011071 A1* | 1/2023 | Rossato | H04N 19/88 |
| 2023/0096567 A1* | 3/2023 | Nalci | H04N 19/42 375/240.03 |
| 2023/0336784 A1* | 10/2023 | Esenlik | H04N 19/70 |
| 2025/0159177 A1* | 5/2025 | Ahn | H04N 19/13 |

FOREIGN PATENT DOCUMENTS

| | | |
|---|---|---|
| WO | WO 2022/128105 A1 | 6/2022 |
| WO | WO 2022/128138 A1 | 6/2022 |

OTHER PUBLICATIONS

International Search Report and Written Opinion issued in International Agglication No. PCT/US 24/25378 dated Aug. 12, 2024, 9 pages.
Huang et al. "Toward semantic communications: Deep learning-based image semantic coding." *IEEE Journal on Selected Areas in Communications* 41, No. 1 Aug. 9, 2022, 34 pages.

\* cited by examiner

*Primary Examiner* — Nasim N Nirjhar
(74) *Attorney, Agent, or Firm* — Crowell & Moring LLP

(57) ABSTRACT

This disclosure relates generally to image coding and particularly to methods and systems for neural image compression (NIC). The disclosed NIC decoder/encoder may include various neural network components that are configured to achieve a balance between network complexity and coding efficiency. Such a NIC decoder/encoder implementation particularly include a core decoder and a hyper decoder each including a neural network architecture adapted for achieving a lightweight decoder/encoder.

20 Claims, 10 Drawing Sheets

EFFICIENT NEURAL NETWORK DECODER FOR IMAGE COMPRESSION

INCORPORATION BY REFERENCE

This application is based on and claims the benefit of priority to U.S. Provisional Patent Application No. 63/460,889 filed on Apr. 20, 2023 and entitled "Efficient Neural Network Decoder for Image Compression," which is herein incorporated by reference in its entirety.

TECHNICAL FIELD

This disclosure relates generally to image coding and particularly to methods and systems for neural image compression.

BACKGROUND

Artificial Intelligence (AI) technics, including but not limited to Deep Neural Networks (DNNs) may be applied to various aspects of image or video compression. For example, various coding tools may involve assistance of pretrained AI models. For another example, an end-to-end AI-based video or image encoder and/or a video or image decoder may be based on DNNs. Such end-to-end encoding and/or decoding may be referred to as Neural Image Compression (NIC). In comparison to traditional video or image coders and decoders, an end-to-end NIC system may be optimized holistically through an automatic training process, rather than having to rely on individually optimization a large number of separate coding tools and not being able to take advantage of optimization correlations between these coding tools. An end-to-end NIC system thus may help improve coding performance (e.g., rate-distortion performance) via a single-module optimization process. In order to achieve such optimization, a balance between complexity of the NIC models, training efficiency, and coding gain should be considered.

SUMMARY

This disclosure relates generally to image coding and particularly to methods and systems for neural image compression (NIC). The disclosed NIC decoder/encoder may include various neural network components that are configured to achieve a balance between network complexity and coding efficiency. Such a NIC decoder/encoder implementation particularly include a core decoder and a hyper decoder each including a neural network architecture adapted for achieving a lightweight decoder/encoder.

In some example implementations, a method for decoding a coded bitstream of an image is disclosed. The decoder may include a hyper decoder, a core decoder, and a context model. The method may include generating a set of hyper data items from the coded bitstream by the hyper decoder; generating a set of contextual parameters by the context model; generating latent representation samples of the image by processing the coded bitstream and a set of entropy parameters generated from the set of hyper data items and the set of contextual parameters; and reconstructing image samples from the latent representation sample of the image by the core decode. The core decoder comprises a neural network with three or fewer upsampling stages.

In the example implementations above, the core decoder comprises three upsampling stages, each sequential pair of the three upsampling stages are connected via at least a cropping neural network layer and an activation neural network layer.

In any one of the example implementations above, a single-dimension upsampling ratio for the three upsampling stages is 2, 2, and 4 sequentially, or 2, 4, and 2 sequentially, or 4, 2, and 2 sequentially.

In any one of the example implementations above, no convolutional neural network layer is placed between three upsampling stages.

In any one of the example implementations above, the core decoder comprises two upsampling stages connected via a cropping neural network layer, an activation neural network layer and a convolution neural network layer.

In any one of the example implementations above, a single-dimension upsampling ratio for the two upsampling stages is 4 and 4 sequentially.

In any one of the example implementations above, the hyper decoder comprises at least two upsampling stages and a sequentially first upsampling stage is directly connected to entropy decoded data items from the coded bitstream.

In any one of the example implementations above, each pair of adjacent upsampling stages are connected via at least a cropping neural network layer, an activation neural network layer, and a convolution neural network layer.

In any one of the example implementations above, no cropping neural network layer is included between at least one pair of adjacent upsampling stages.

In any one of the example implementations above, at least one of the at least two upsampling stages comprises a convolutional neural network layer.

In any one of the example implementations above, at least one of the at least two upsampling stages comprises a pixel shuffle neural network with a convolution neural network layer.

In any one of the example implementations above, at least one of the at least two upsampling stages comprises a transpose convolution neural network layer.

In any one of the example implementations above, the coded bitstream are generated for a Y component, a U component, and a V component of the image, and the Y component and the U and V components of the image are decoded using separate models for the hyper decoder and the decoder; or the encoded bitstream are generated for an R component, a G component, and a B component of the image, and the R component, the component G, and the B component of the image are decoded using separate models for the hyper decoder and the core decoder.

Aspects of the disclosure also provide an electronic decoding device or apparatus or electronic encoding device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

Aspects of the disclosure also provide non-transitory computer-readable recording mediums for storing the bitstream above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a" "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
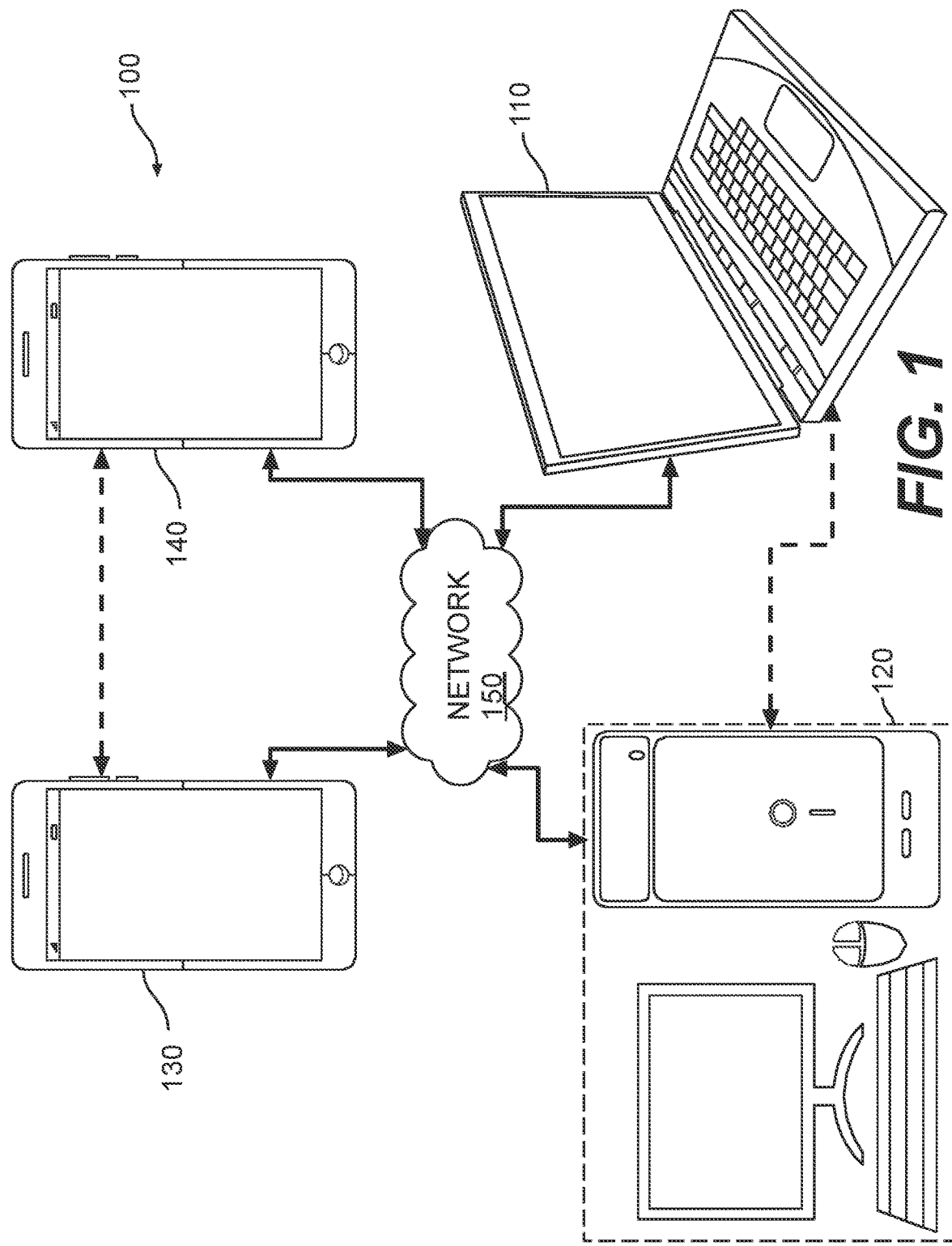
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video/image data in the form of one or more coded bitstreams (e.g., of a stream of video/image pictures that are captured by the terminal device (110)) for transmission via the network (150). The encoded video/image data can be transmitted in the form of one or more coded video/image bitstreams. The terminal device (120) may receive the coded video/image data or image data from the network (150), decode the coded video/image data or image data to recover the video or image pictures and display the video or image pictures according to the recovered video or image data. Unidirectional data transmission may be implemented in media serving applications and the like.

In another example, the second pair of terminal devices (130) and (140) may perform bidirectional transmission of coded video/image data, for example, during a videoconferencing application. For bidirectional transmission of data, in an example, each of the terminal devices (130) and (140) may code video/image data (e.g., of a stream of video/image pictures that are captured by the terminal device) for transmission to and may also receive coded video/image data from another of the terminal devices (130) and (140) to the other terminal device of the terminal devices (130) and (140) via the network (150). Each terminal device of the terminal devices (130) and (140) also may receive the coded video/image data transmitted by the other terminal device of the terminal devices (130) and (140), and may decode the coded video/image data to recover the video/image pictures and may display the video/image pictures at an accessible display device according to the recovered video/image data.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video/image data among the terminal devices (110), (120), (130) and (140), including for example wireline (wired) and/or wireless communication networks. The communication network (150) may exchange data in circuit-switched, packet-switched, and/or other types of channels. Representative networks include telecommunications networks, local area networks, wide area networks and/or the Internet. For the purposes of the present discussion, the architecture and topology of the network (150) may be immaterial to the operation of the present disclosure unless explicitly explained herein.

Figure 2:
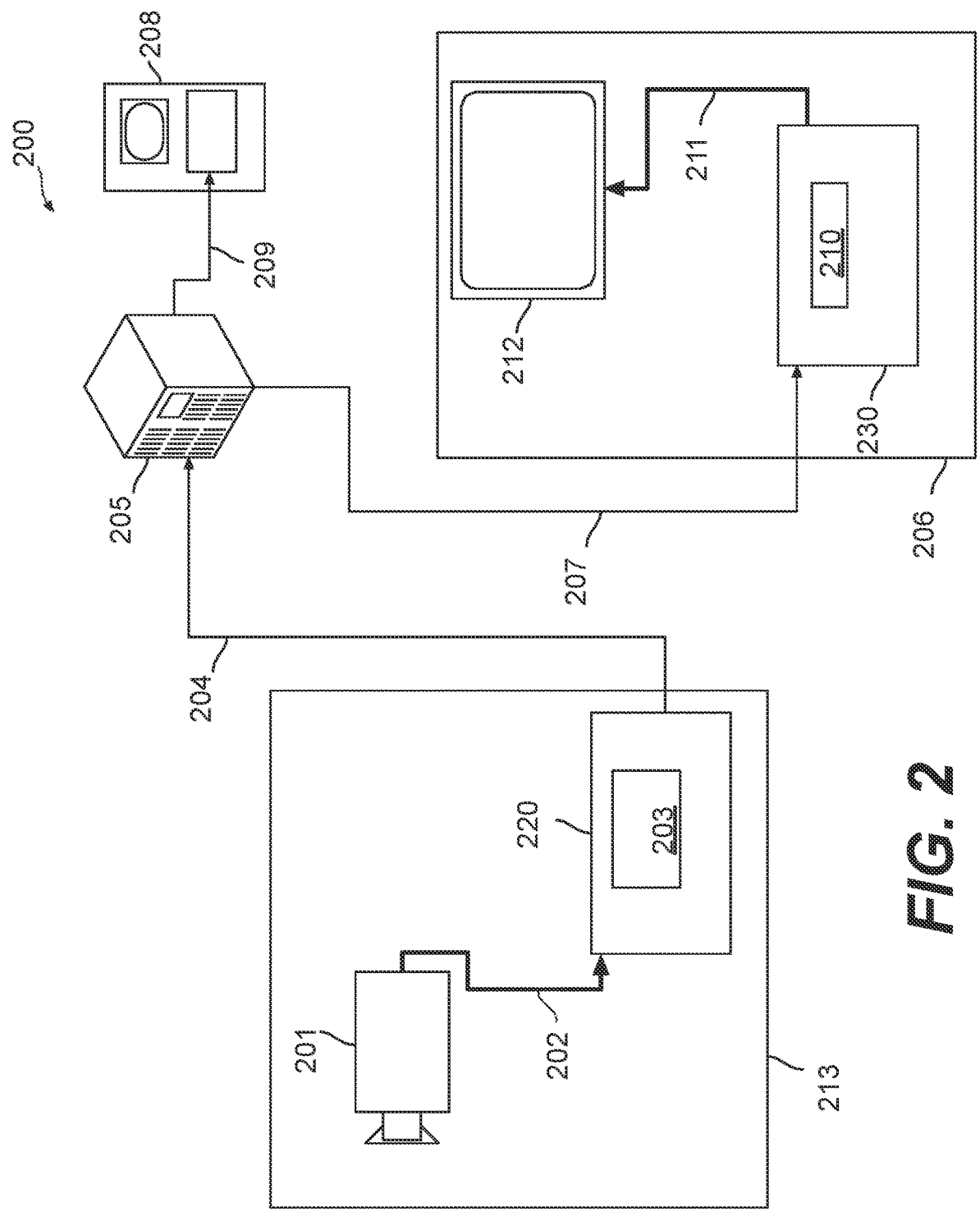
FIG. 2 shows a schematic illustration of a simplified block diagram of a communication system (200) in accordance with an example embodiment.

FIG. 2 illustrates, as an example for an application for the disclosed subject matter, a placement of a video/image encoder and a video/image decoder in a video/image streaming environment. The disclosed subject matter may be equally applicable to other video/image applications, including, for example, video conferencing, digital TV broadcasting, gaming, virtual reality, storage of compressed video/image on digital media including CD, DVD, memory stick and the like, and so on.

As shown in FIG. 2, a video/image streaming system may include a video/image capture subsystem (213) that can include a video/image source (201), e.g., a digital camera, for creating a stream of video/image pictures or images (202) that are uncompressed. In an example, the stream of video/image pictures (202) includes samples that are recorded by a digital camera of the video/image source 201. The stream of video/image pictures (202), depicted as a bold line to emphasize a high data volume when compared to encoded video/image data (204) (or coded video/image bitstreams), can be processed by an electronic device (220)

that includes a video/image encoder (203) coupled to the video/image source (201). The video/image encoder (203) can include hardware, software, or a combination thereof to enable or implement aspects of the disclosed subject matter as described in more detail below. The encoded video/image data (204) (or encoded video/image bitstream (204)), depicted as a thin line to emphasize a lower data volume when compared to the stream of uncompressed video/image pictures (202), can be stored on a streaming server (205) for future use or directly to downstream video/image devices (not shown). One or more streaming client subsystems, such as client subsystems (206) and (208) in FIG. 2 can access the streaming server (205) to retrieve copies (207) and (209) of the encoded video/image data (204). A client subsystem (206) can include a video/image decoder (210), for example, in an electronic device (230). The video/image decoder (210) decodes the incoming copy (207) of the encoded video/image data and creates an outgoing stream of video/image pictures (211) that are uncompressed and that can be rendered on a display (212) (e.g., a display screen) or other rendering devices (not depicted). The video/image decoder 210 may be configured to perform some or all of the various functions described in this disclosure. In some streaming systems, the encoded video/image data (204), (207), and (209) (e.g., video/image bitstreams) can be encoded according to certain video/image coding/compression standards.

It is noted that the electronic devices (220) and (230) can include other components (not shown). For example, the electronic device (220) can include a video/image decoder (not shown) and the electronic device (230) can include a video/image encoder (not shown) as well.

Figure 3:
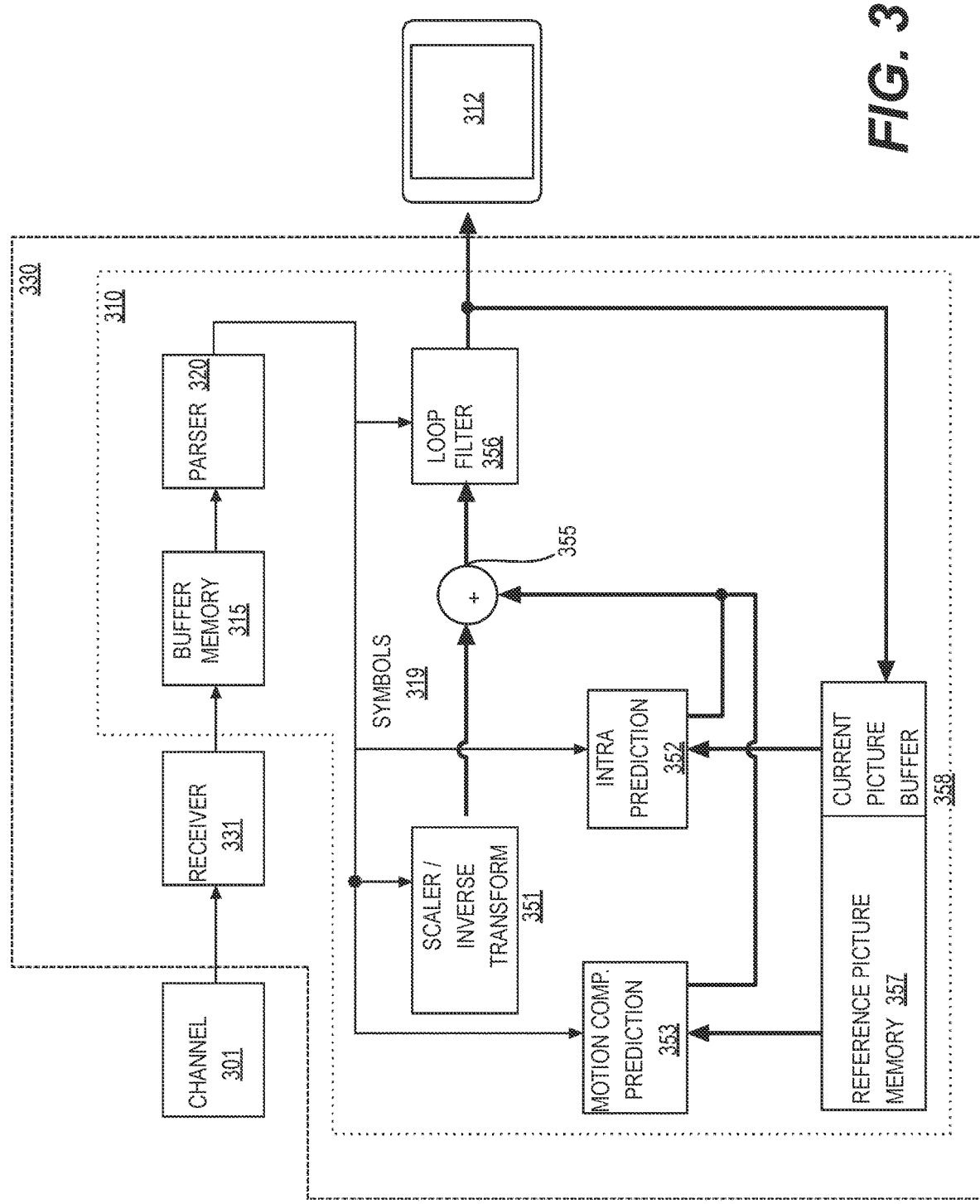
FIG. 3 shows a schematic illustration of a simplified block diagram of a video decoder in accordance with an example embodiment.

FIG. 3 shows a block diagram of an example video/image decoder (310) of an electronic device (330) according to any embodiment of the present disclosure below. The electronic device (330) can include a receiver (331) (e.g., receiving circuitry). The video/image decoder (310) can be used in place of the video/image decoder (210) in the example of FIG. 2.

The disclosure below for FIGS. 3-6 describes example video encoding/decoding systems where a video being encoded or decoded includes a sequence of images. Aspect of such video encoder/decoder applicable to an individual image (particular in intra coding mode) are applicable to still image encoding/decoding.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
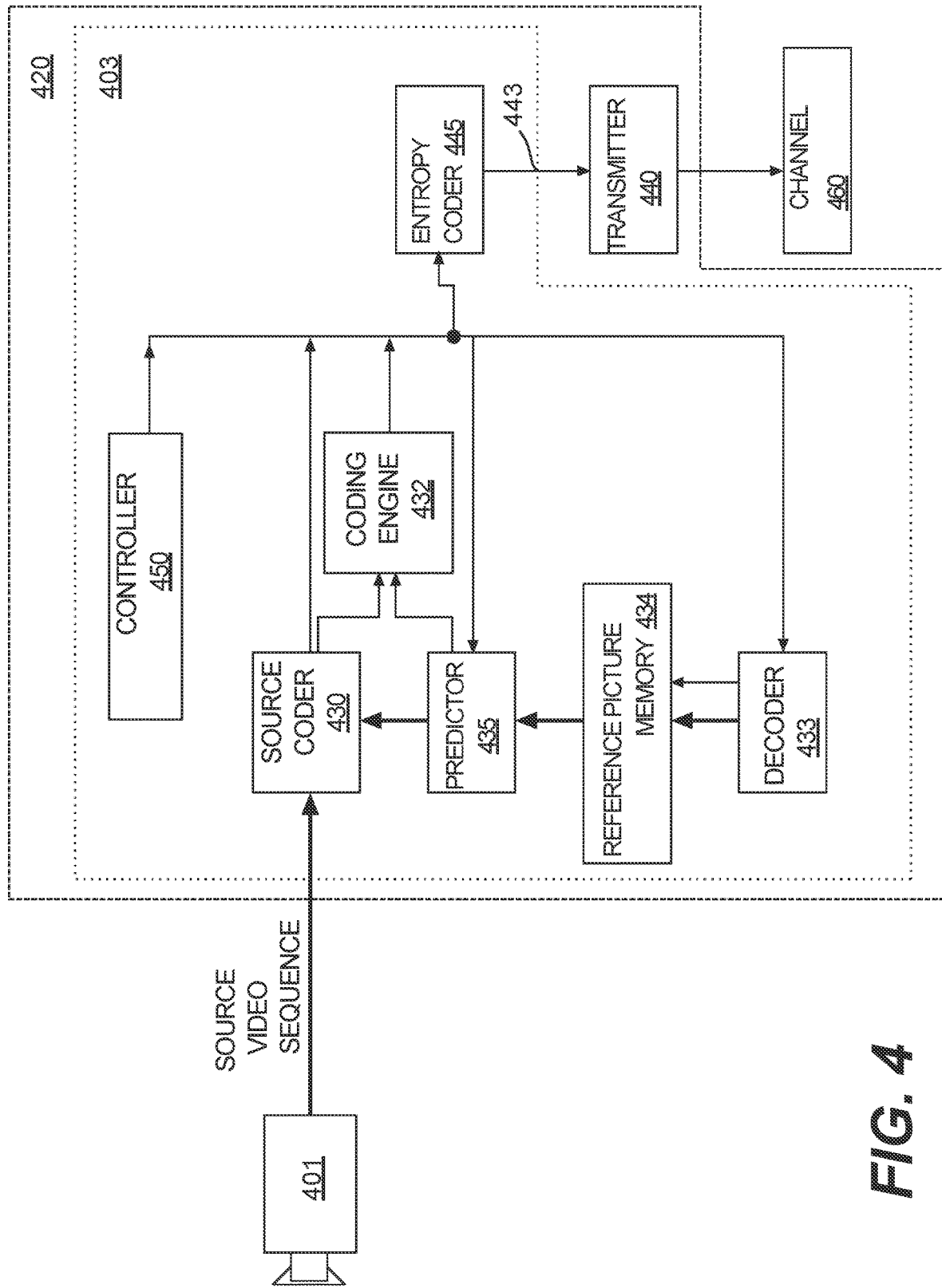
FIG. 4 shows a schematic illustration of a simplified block diagram of a video encoder in accordance with an example embodiment.

FIG. 4 shows a block diagram of an example video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
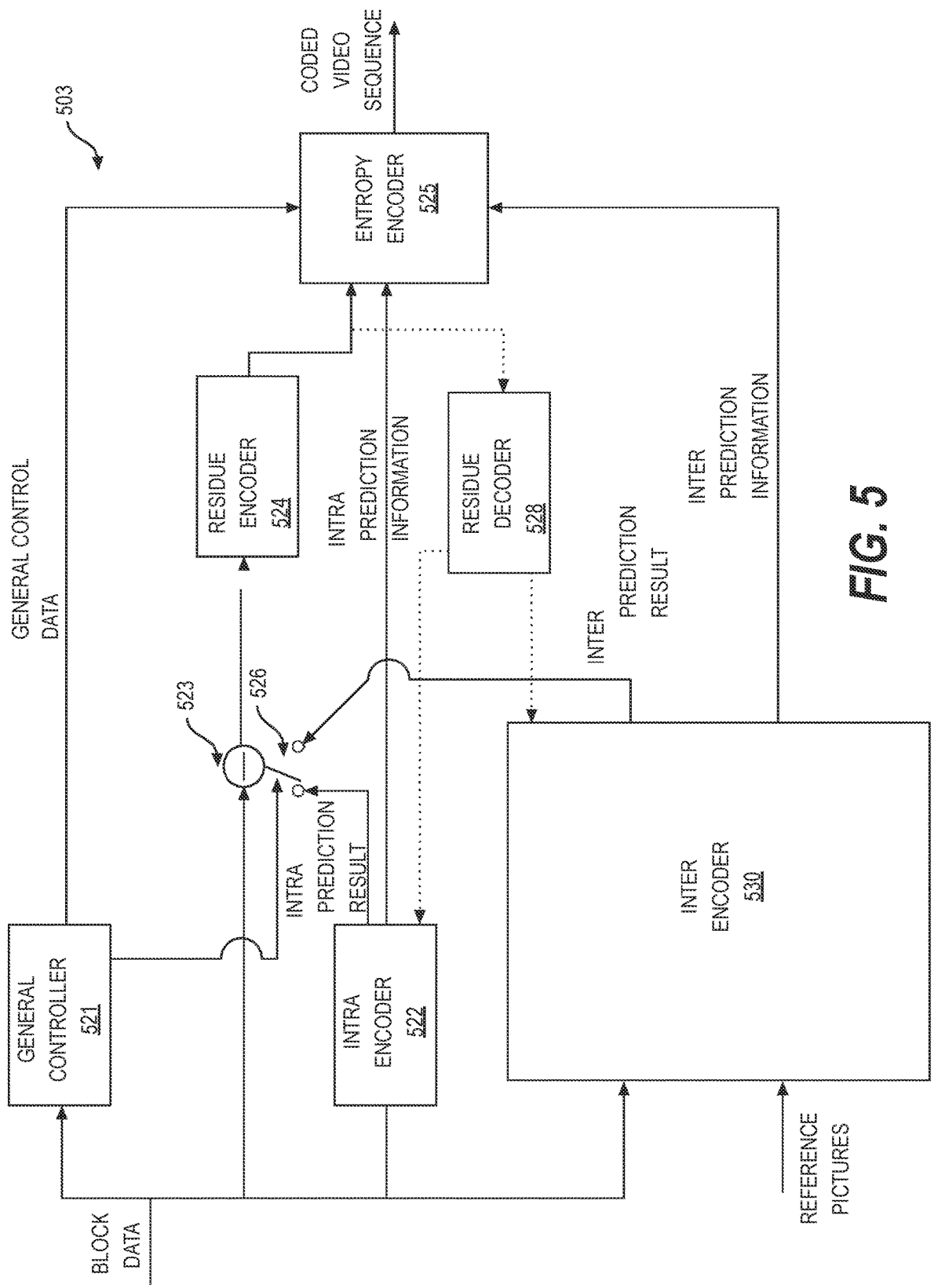
FIG. 5 shows a block diagram of a video encoder in accordance with another example embodiment.

FIG. 5 shows a diagram of an example video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
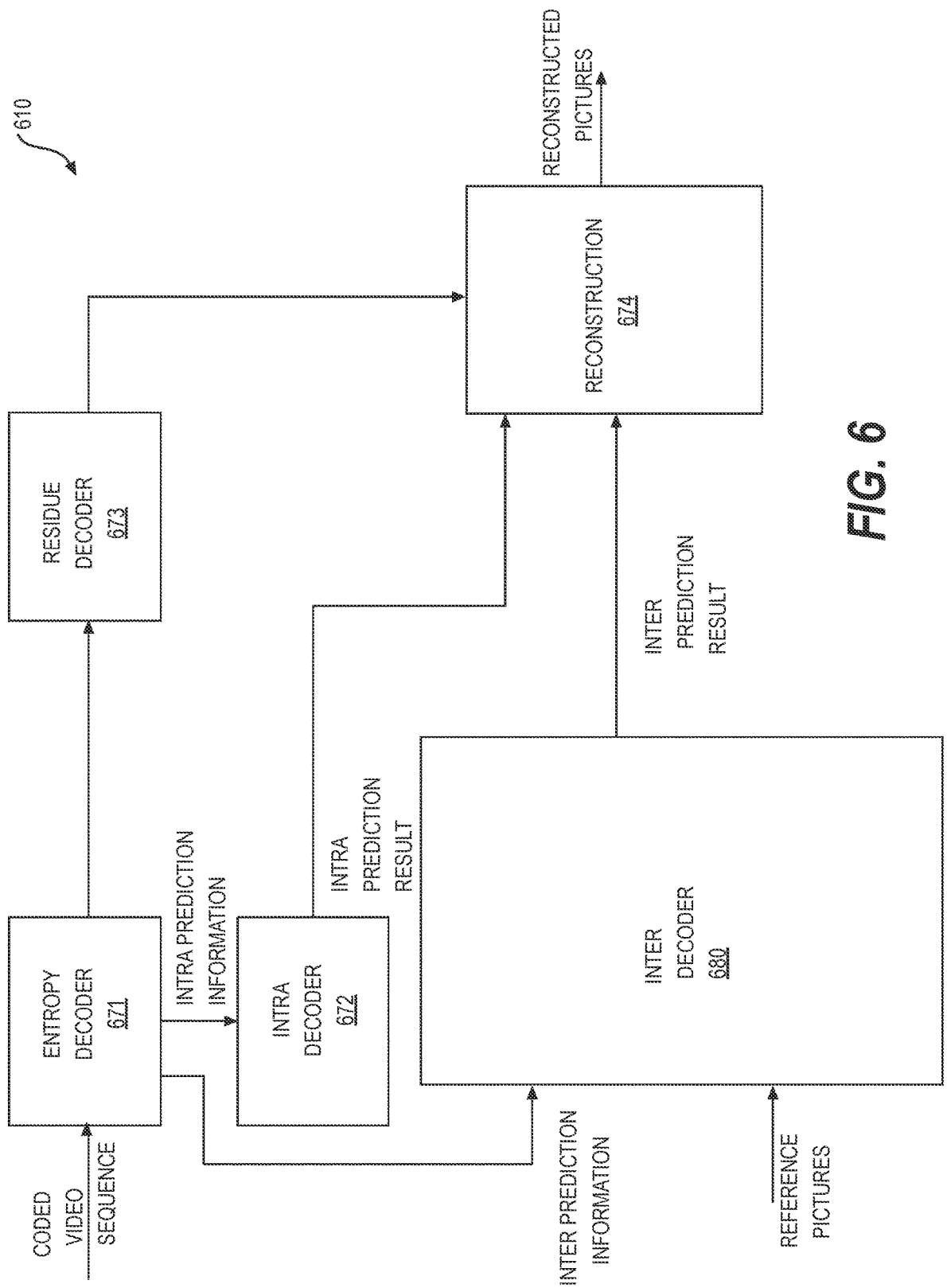
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

The example video encoder and decoder implementations above may thus include multiple separate video data processing components. Each of these components may be supported by one or more coding tools. Improvement of such encoders and/or decoders may thus involve optimization of one or more of the individual coding tools or data processing components. However, it may be difficult and inefficient to perform a system level optimization. As such, coding gains that may be potentially gained due to correlation between these components may be difficult to achieve.

In some other example implementations, rather than using the example video encoding and decoding architecture illustrated in FIGS. 3-6, a video encoding/decoding system may be constructed based on inference by AI models. Such a video encoding/decoding system may include one or more AI models that may be collectively or jointly trained in an end-to-end E2E) manner. Such AI models may particularly be based on neural networks, such as Deep-learning Neural Networks (DNNs), and such E2E AI-based video encoding/decoding system may correspondingly be referred to as Neural Image Compression (NIC).

A general example framework of NIC is described below. Given an input image x, the target of NIC is to use the image x as the input to a DNN encoder to compute a compressed representation $\hat{x}$ that is compact for storage and transmission purposes. And then, use $\hat{x}$ as the input to a DNN decoder to reconstruct an image $\bar{x}$. In some example implementations, an NIC method may take a variational autoencoder (VAE) structure, where the DNN encoder directly use the entire image x as its input, which is passed through a set of network layers that contain connecting neuron units and work like a black box to compute the output compressed representation $\hat{x}$. Correspondingly, an example DNN decoder may take the entire compressed representation $\hat{x}$ as its input, which is passed through another set of network layers that contain connecting another set of neuron units and work like another black box to compute the reconstructed $\bar{x}$. During an iterative training process, a Rate-Distortion (R-D) loss may be optimized to achieve trade-off between the distortion loss $D(x, \bar{x})$ of the reconstructed image and the bit consumption R of the compact representation $\hat{x}$ with a trade-off hyperparameter $\lambda$. An example loss function thus may be represented by:

$$L(x, \bar{x}, \hat{x}) = \lambda D(x, \bar{x}) + R(\hat{x}).$$

Figure 7:
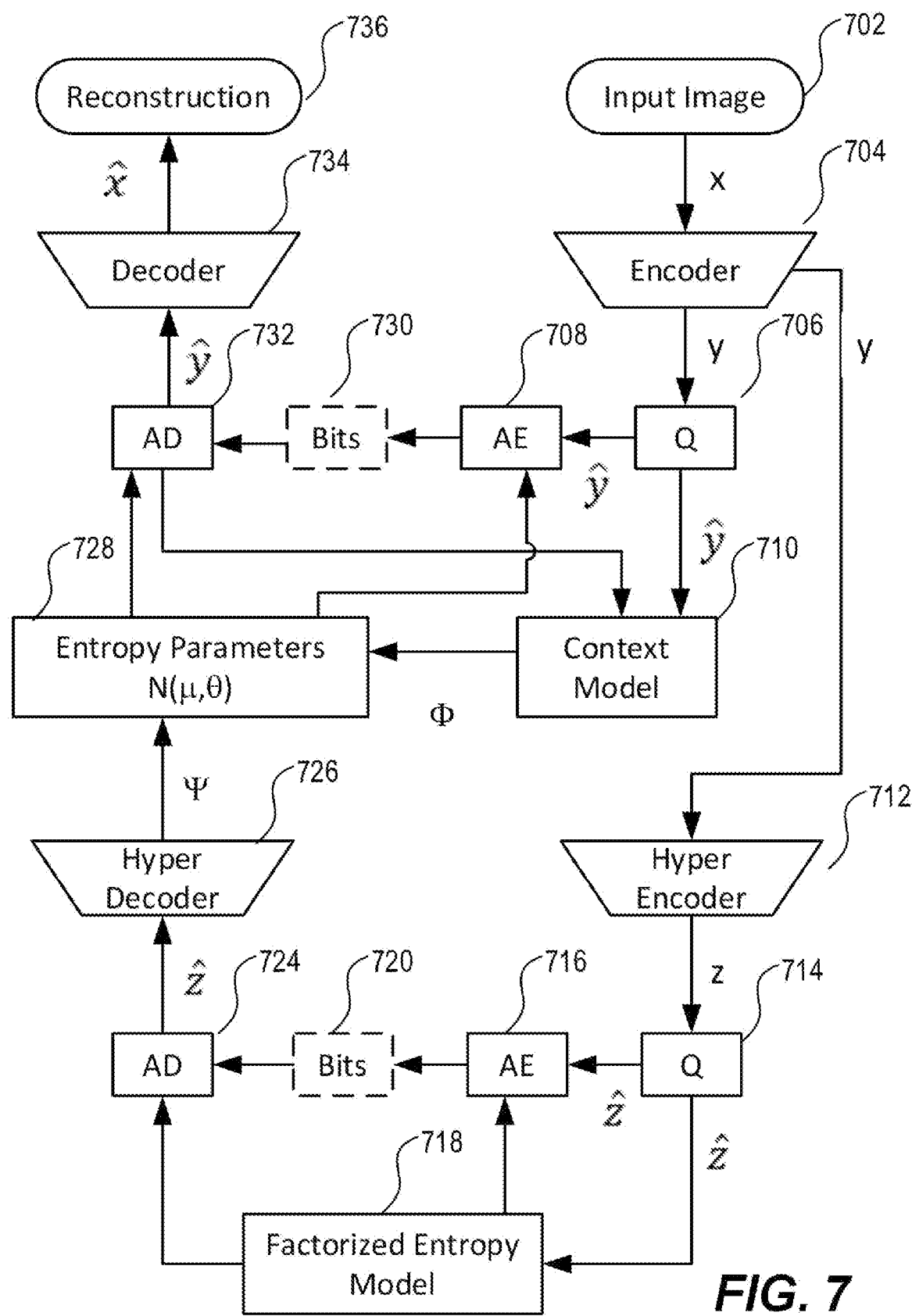
FIG. 7 shows and example Neural Image Compression (NIC) model.

FIG. 7 shows an example architecture of a generalized NIC model. The NIC model includes a first sub-network containing a core autoencoder for leaning quantized latent representation of images and a sub-network for leaning a probabilistic model over quantized latent representation for entropy coding. In FIG. 7, the first sub-network for the core autoencoder includes an "encoder" block and a "decoder" block. The second sub-network includes a "context model", a hyper network (including a "hyper encoder" block and a "hyper decoder" block). The context model may function as an autoregressive model for processing the quantized latent representation. The hyper network may be configured to learn a representation of information for correcting context-based predictions. The output of the context model and the hyper network may be combined by an "entropy parameter" network for generating mean and scale parameters for, e.g., a conditional Gaussian entropy model.

In FIG. 7, "AE" represents an Arithmetic Encoding block, which produce compressed representation of symbols from a quantizer, represented by a "Q" block in FIG. 7. For decoding, any information that depends on the quantized latent representation may be used by the decoder block once it has been decoded. The context model should only access the quantized latent representation that has been decoded (the arrow between the Arithmetic Decoding ("AD" block).

In further detail for the example implementation of FIG. 7, the input to the encoder is represented by input image x 702. The output of the encoder 704 is the latent representation, represented by y, which after the quantizer Q, becomes quantized latent representation of the input image, $\hat{y}$. The latent representation y is input into the hyper encoder to generate hyper latents z, which is quantized by the quantizer to generate quantized hyper latents $\hat{z}$. The quantized latent representation f may be processed by the arithmetic encoder AE 708 to generate encoded bits 730. The quantized hyper latent $\hat{z}$ may be further coded by AE 716 to generate encoded bits 720 of the hyper latents. The arithmetic decoder 724 may be configured to decode the encoded bits 720 to generate reconstructed quantized hyper latents $\hat{z}$. The arithmetic encoder 710 and decoder 724 for hyper latents may be assisted by a factorized entropy model 718. The reconstructed hyper latents $\hat{z}$ may be processed and decoded by the hyper decoder 726 for facilitating entropy coding. The output of the hyper decoder 726 and the output of the context model 710 may form entropy parameters 728 for assisting the arithmetic decoder AD 732 in processing the coded bits 730 to generate decoded quantized latent representation $\hat{y}$, which is further processed by the decoder 734 to generate the reconstructed image x̂. The encoder 704 and the decoder 734 may be alternatively referred to as core encoder and decoder (to differentiate from the hyper encoder 712 and the hyper decoder 726).

As such, for encoding the input image 702 to generate bits 730 and 720, all blocks of FIG. 7 except the decoder 734 would be involved, including the decoding branch containing the factorized entropy model network 718, the AD 724, the hyper decoder 726, the entropy parameter network 728 and the AD 732, in order to feed back reconstructed quantized latents ŷ to the context model 710. The decoding path for the bits 730 and 720 would involve the decoding branch above and would additionally include the context model 710 (which only need to access the reconstructed quantized latents ŷ.

In some example implementations of FIG. 7, the encoder 704 includes a set of vision module (such as convolutional network, or vision transformer) with downsampling function; while the decoder 734 may include a set of vision module (such as convolutional network, or vision transformer) with upsampling function.

The further disclosure below concerns various example implementations the hyper decoder 726 and decoder 734 above. These examples particularly provide various lightweight hyper decoder and/or decoder structures for decoding the encoded bits 720 and 730. Further, because the hyper decoder 726 in particular is part of the encoding process, these example implementations additionally help balancing the complexity of the networks involved in the decoding branch and the coding efficiency (in terms of the size of the bits 720 and 730).

Figure 8:
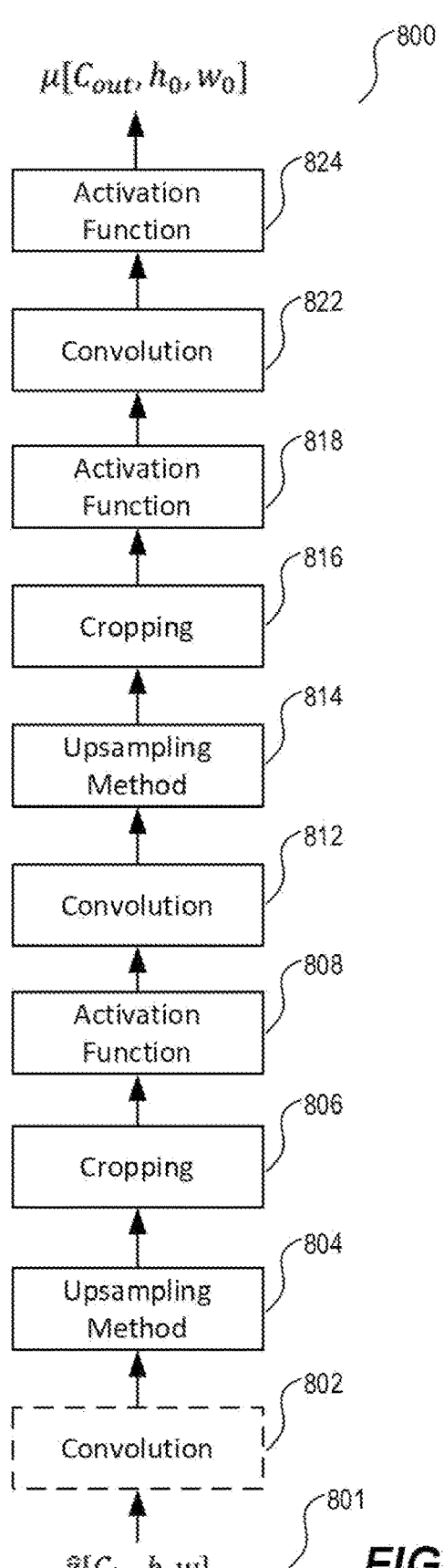
FIG. 8 shows an example hyper decoder block that can be used in the NIC model of FIG. 7.

An example implementation of the hyper decoder 726 is shown in FIG. 8 as neural network 800. The data processing path in the example hyper decoder 800 is shown as flowing from the bottom to the top. Input 801 to the hyper decoder 800 may be the quantized hyper latent 2. The hyper decoder 800 may include a first convolution layer 802, followed by an upsampling layer 804, a cropping layer 806, and an activation function layer 808. Such convolution, upsampling, cropping, and activation may be repeated one or more times, such as the example single repetition shown in 812 through 818 of FIG. 8 in order to recover resolution reduced by down sampling in the corresponding hyper encoder 712 of FIG. 7. The final layers of the example hyper decoder 800 may include a convolution layer 822 and an activation function layer 814. The term "layer" may be alternatively referred to as "network", as such, the convolutional layer, the upsampling layer, the cropping layer, the activation function layer, and the like may be alternatively referred to as convolutional network, the upsampling network, the cropping network, the activation function network, and the like.

In some example implementations, the first convolution layer or network 802 of FIG. 8 may be removed (as shown by the dashed outline for 802). The resulting example network would include two upsampling stages and two convolution layers rather than 3 convolution layers. In some other example implementations, there may be more than two upsampling stages (each, for example, include a upsampling layer, a cropping layer, and an activation function layer), and a convolutional layer may be included between each adjacent upsampling stages. Such upsampling states may be followed by the final coevolution layer and activation function layer 822 and 824 before outputting learned parameters. Upsampling network such as 804 and 814 may be implemented using any types of upsampling method. For example, upsampling may be performed using one or more convolutional network. For another example, upsampling may be performed based on pixel shuffling. Additionally, the activation function layers such as 808 and 818 may be based on any suitable activation form. The removal of the first convolution layer 802 in FIG. 8 may help reduce the complexity of the hyper decoder. The information embedded in the neural network parameters associated with the first convolution layer 802 may nevertheless be captured by the network parameters in the upsampling stages (either by using convolutional networks or using pixel shuffle networks). As such, the removal of the first convolutional layer may provide reduced complexity and shorter inference time of the model without much sacrifice in performance.

In some other example implementations, the one of more of the cropping layers or cropping networks 806 and 816 may be removed. Specifically, the amount of calculation gain for the hyper decoder 800 as a result of the cropping (reduction of number of data points) may be insignificant (e.g., edge points may be zero padded and thus removal of these points may not result in significant savings in the amount of calculations of the network s in the hyper decoder 800), while a removal of such cropping layer would result in smaller model and fewer model parameters, thereby improving the training process and inference time.

Figure 9:
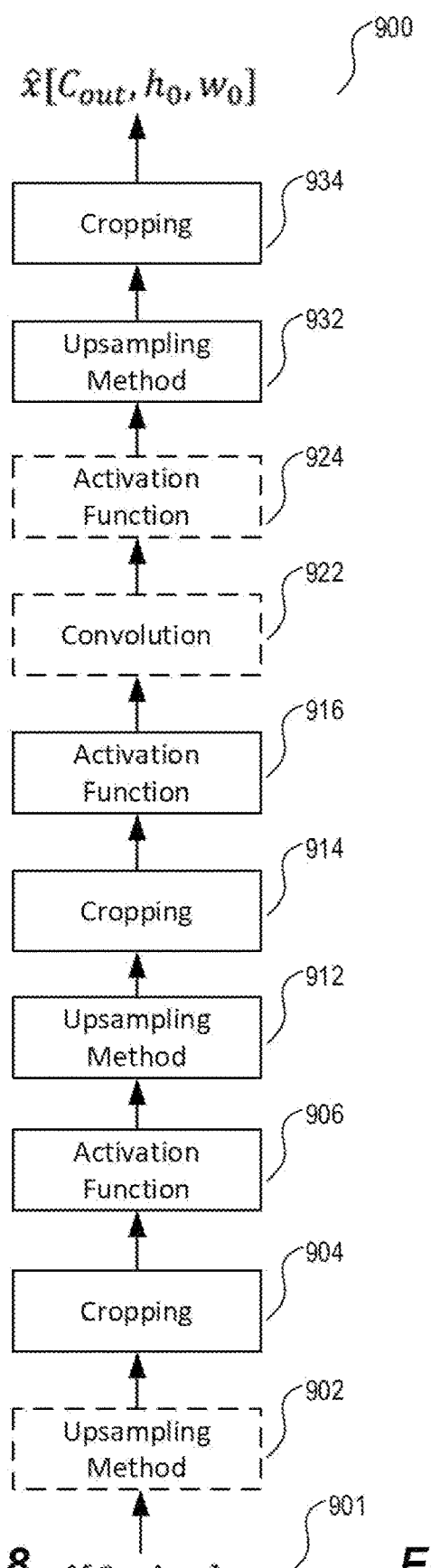
FIG. 9 shows an example decoder block that can be used in the NIC model of FIG. 7.

An example implementation of the decoder 734 is shown in FIG. 9 as neural network 900. The data processing path in the example decoder 900 is shown as flowing from the bottom to the top. Input 901 to the decoder neural network 900 may be the quantized latent f. The hyper decoder neural network 900 may include a plurality of upsampling stages, including, for example, a first upsampling network 902, a second upsampling network 912 and a third upsampling network 924. Each of the upsampling networks may be followed by a cropping network and then an activation function network. In other words, each sequential pair of upsampling stages may be connected by at least a cropping network and an activation network. The last upsampling stage, 934, for example may be followed by a cropping network 934. For example, the upsampling network 902 may be followed by a cropping network 904 and then an activation function network 906. Likewise, the upsampling network 912 may be followed by a cropping network 914 and then an activation function network 916. One or more convolution network with activation network may be further included and may be disposed between the upsampling stages. In FIG. 9, a coevolution 922 and activation network 924 is shown as being placed between the second and third upsampling stages.

In the example decoder neural network 900 of FIG. 9, the various upsampling stages are configured to increase the resolution of the output image by inserting new pixels into each of the previous stage between existing pixels. Each of the upsampling stage may be characterized by an upsampling factor, representing the ratio between a number of pixels after the upsampling process and a number of pixels before the upsampling process in one dimension. A 2D image is upsampled by a factor of 2 when the image's dimensions are doubled in both height and width. For example, an image that is originally 200×200 pixels would be upsampled to 400×400 pixels when using an upsampling factor of 3. Similarly, if a 2D image is upsampled by a factor of 4, it means that the dimensions of the image are increased four times in both height and width. For example, an image that is originally 200×200 pixels would be upsampled to 800×800 pixels when using an upsampling factor of 4.

The upsampling process in the decoder may be performed in stages. In the example of FIG. 9, three stages of upsampling are involved. The three upsampling stages may be configured to achieve a combined upsampling of a factor of 16. In one example, the distribution of the upsampling factors in the three upsampling stages may be 2, 2, and 4. Alternatively, the upsampling factors may be distributed as 2, 4, and 2, or 4, 2, and 2. Upsampling stages.

In some other example implementations, 4 stages of upsampling may be involved for achieving a factor of 16 upsampling, with each of the upsampling stages configured to achieving a factor of 2 upsampling. The three-stage implementations, in comparison to the four-stage implementation may help reduce an overall complexity of the of the decoder network, thereby facilitating training of the model and reducing inference time. Like the three-stage, each sequential pair of upsampling stages may be connected by at least a cropping network and an activation network implementation above. The last upsampling stage may be followed by a cropping network. In some example implementations, between some sequential pair of the upsampling stage in the four-stage decoder, a convolution network and a cropping layer may be further included.

In some example implementations, only two upsampling stages may be included in the decoder above. The two stages may be connected via at least a cropping network and an activation function network. The second upsampling stage may be followed by a cropping network.

Each of the upsampling stages above may be based on any upsampling processes. For example, each of the upsampling stages (or the upsampling method layer of FIG. 9) may be based on pixel shuffle with a regular convolution network (for changing channels), or transpose convolution, or another other suitable upsampling networks.

In the example of FIG. 9, a regular convolution layer or network 922 may be added in between some adjacent upsampling stages, e.g., between the second and third upsampling stages. In some other example implementations, such a regular convolution layer or network may be further added between the first and second upsampling stages. In some other example implementations, such a regular convolution layer(s) or network(s) may be removed (shown as dashed outline for element 922 in FIG. 9), such that the information carried in the model parameter of these layers may instead be embedded in parameters of other network layers during the training process, thereby reducing the overall complexity of the decoder neural network 900. Likewise, the corresponding inter-upsampling stage activation function layers or networks 924 may also be removed together with the convolution layer 922 for further reducing the complexity of the model (as shown by the dashed outline for element 924). After removing of the convolution layer 922 and activation function layer 924, the example three-stage decoder neural network 900 of FIG. 9 would include the three upsampling stages with cropping and activation function networks in between (including 902, 904, 906, 912, 914, 924, 932, and 934).

In some example implementations, the encoder, hyper encoder, hyper decoder and decoder above (e.g., in FIG. 7) may be implemented with different designs for different image components, e.g., Y and UV components, or R, G, and B components. Each of the encoder, hyper encoder, hyper decoder, and decoder may designed as separate networks for the color components. In some implementations UV (or chroma components) of the image may be process by one network for each of encoding, hyper encoding, decoding, and hyper decoding. For YUV images, for example, there may be two sets of networks as designed and trained, one for the Y component, and one for the U and V components. For another example, for RGB images, there may be three sets of networks as designed and trained, one for each of the R, G, and B components. These separate networks for color components in terms of encoding, decoding, hyper encoding, and hyper decoding may be crossed referenced in terms of handling of context model and entropy parameter handling in FIG. 7.

The various components of FIG. 7 may be jointly trained using training images or may be trained in stages, where in each training stage, model parameters for some components are fixed and model parameters for other components are optimized. The models that are being optimized shuffles between the training stages that may be iteratively performed.

The various implementations above, particularly the ones related to the neural network architecture sued for the hyper decoders and the decoders may help reducing the model complexity and for achieving a balance between model complexity and reasonable compression rate.

Figure 10:
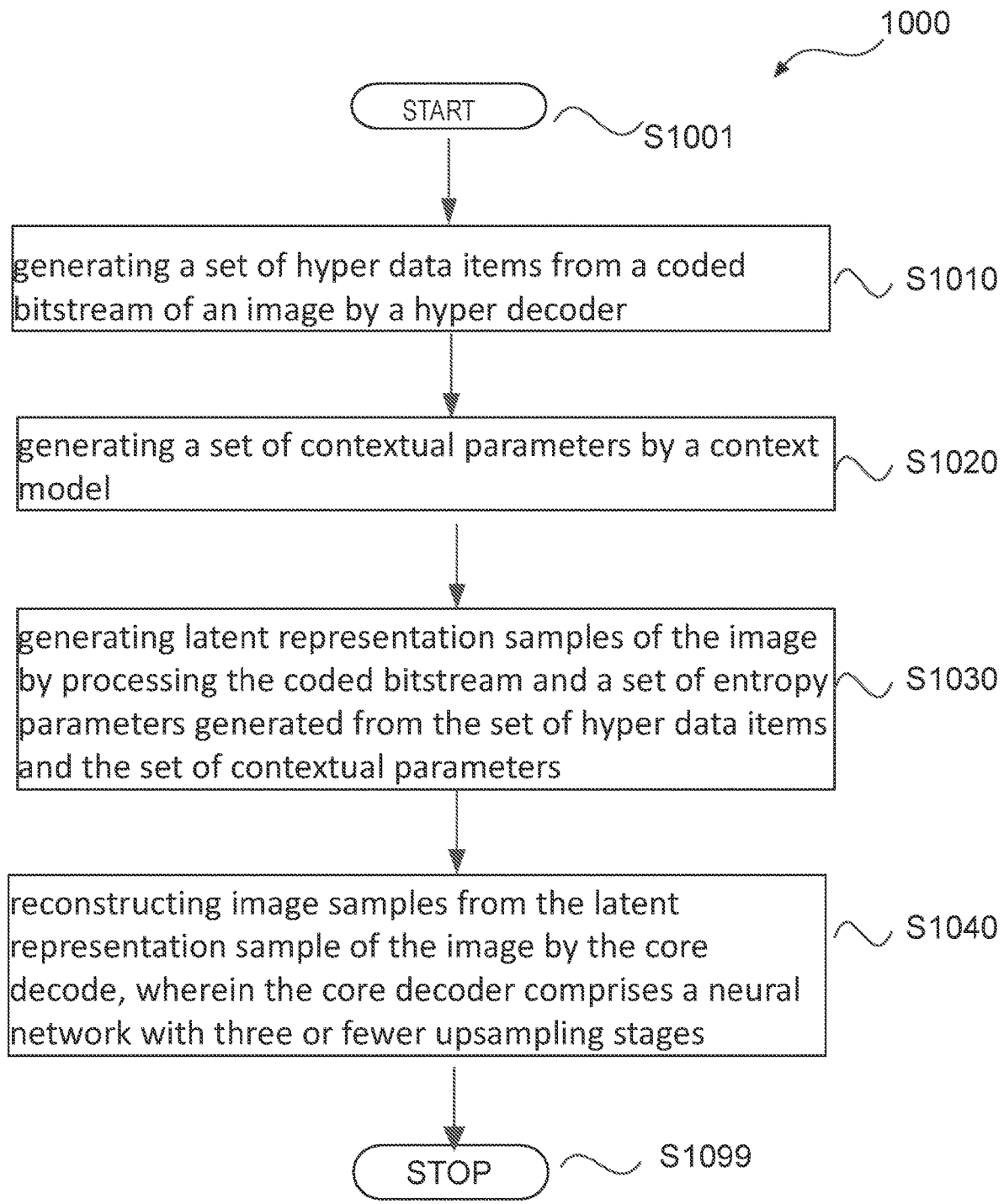
FIG. 10 shows an example logic flow for a method for NIC.

FIG. 10 illustrates an example logic flow 1000 according the implementations above. The logic flow is performed by a decoder including a hyper decoder, a core decoder, and a context model, for decoding an coded bitstream of an image. The logic flow 1300 starts at S1001. In S1010, a set of hyper data items is generated from the coded bitstream by the hyper decoder. In S1020, a set of contextual parameters are generated by the context model. In S1030, latent representation samples of the image are generated by processing the coded bitstream and a set of entropy parameters generated from the set of hyper data items and the set of contextual parameters. In S1040, image samples are reconstructed from the latent representation sample of the image by the core decode, wherein the core decoder comprises a neural network with three or fewer upsampling stages. The logic flow 1300 stops at S1099.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
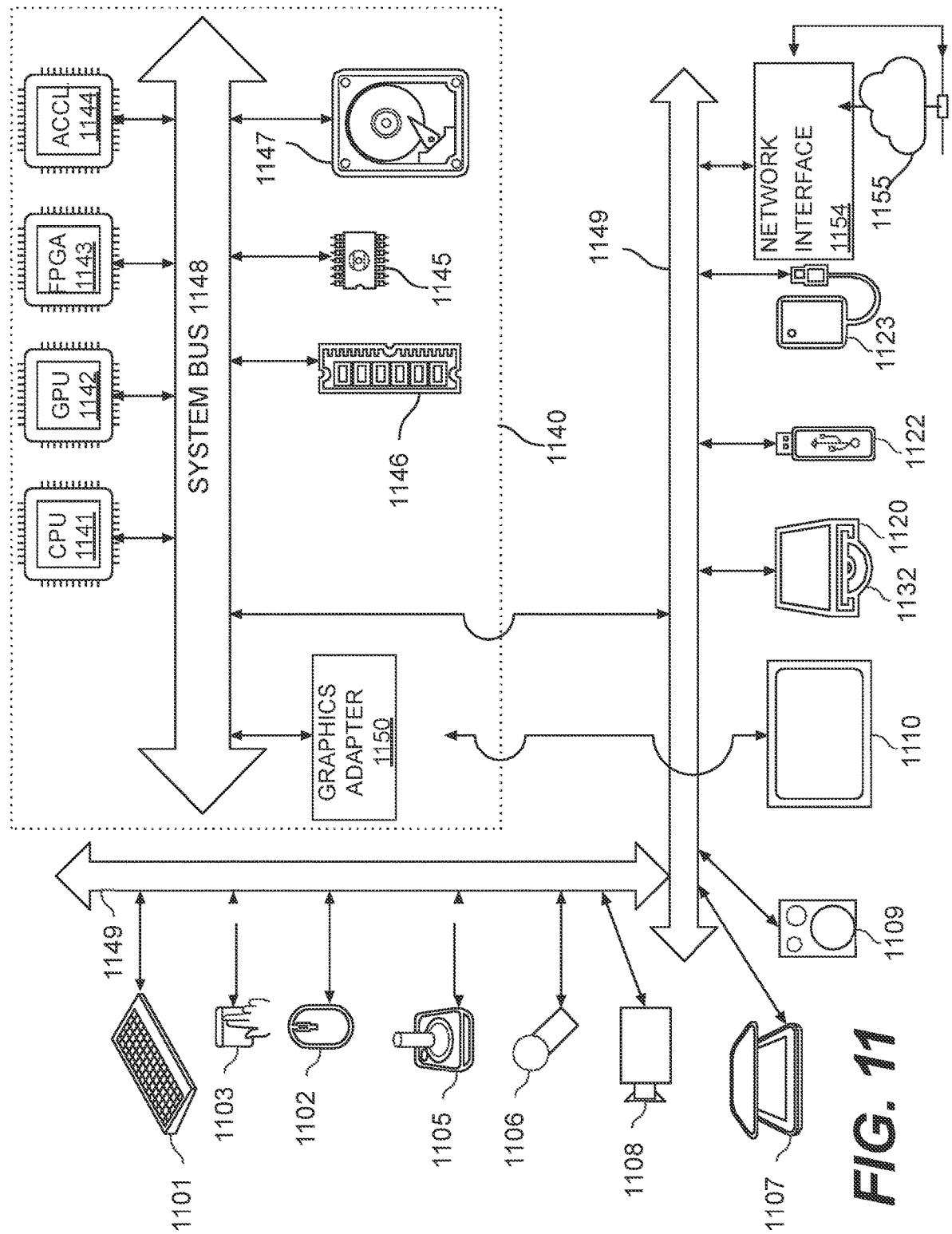
FIG. 11 shows a schematic illustration of a computer system in accordance with example embodiments of this disclosure.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a coded bitstream of an image by a decoder including a hyper decoder, a core decoder, and a context model, the method comprising:
   generating a set of hyper data items from a first coded bitstream of the coded bitstream by the hyper decoder;
   generating a set of contextual parameters by the context model based on previously reconstructed image samples;
   generating latent representation samples of the image by processing a second coded bitstream of the coded bitstream and a set of entropy parameters generated from the set of hyper data items and the set of contextual parameters; and
   reconstructing image samples from the latent representation sample of the image by the core decode,
   wherein the core decoder comprises a neural network with three or fewer upsampling stages.

2. The method of claim 1, wherein the core decoder comprises three upsampling stages, each sequential pair of the three upsampling stages are connected via at least a cropping neural network layer and an activation neural network layer.

3. The method of claim 2, wherein a single-dimension upsampling ratio for the three upsampling stages is 2, 2, and 4 sequentially.

4. The method of claim 2, wherein a single-dimension upsampling ratio for the three upsampling stages is 2, 4, and 2 sequentially.

5. The method of claim 2, wherein a single-dimension upsampling ratio for the three upsampling stages is 4, 2, and 2 sequentially.

6. The method of claim 2, wherein no convolutional neural network layer is placed between three upsampling stages.

7. The method of claim 1, wherein the core decoder comprises two upsampling stages connected via a cropping neural network layer, an activation neural network layer and a convolution neural network layer.

8. The method of claim 7, wherein a single-dimension upsampling ratio for the two upsampling stages is 4 and 4 sequentially.

9. The method of claim 1, wherein the hyper decoder comprises at least two upsampling stages and a sequentially first upsampling stage is directly connected to entropy decoded data items from the coded bitstream.

10. The method of claim 9, wherein each pair of adjacent upsampling stages are connected via at least a cropping neural network layer, an activation neural network layer, and a convolution neural network layer.

11. The method of claim 9, wherein no cropping neural network layer is included between at least one pair of adjacent upsampling stages.

12. The method of claim 9, wherein at least one of the at least two upsampling stages comprises a convolutional neural network layer.

13. The method of claim 9, wherein at least one of the at least two upsampling stages comprises a pixel shuffle neural network with a convolution neural network layer.

14. The method of claim 9, wherein at least one of the at least two upsampling stages comprises a transpose convolution neural network layer.

15. The method of claim 1, wherein:
the first coded bitstream and the second coded bitstream are generated for a Y component, a U component, and a V component of the image; and
the Y component and the U and V components of the image are decoded using separate models for the hyper decoder and the core decoder.

16. The method of claim 1, wherein:
the first coded bitstream and the second coded bitstream are generated for an R component, a G component, and a B component of the image; and
the R component, the component G, and the B component of the image are decoded using separate models for the hyper decoder and the core decoder.

17. A decoder for decoding a coded bitstream of an image, comprising a memory for storing computer instructions and at least one processor configured to execute the computer instructions to generate a set of hyper data items from a first coded bitstream in the coded bitstream by a hyper decoder of the decoder;
generate a set of contextual parameters by a context model of the decoder based on previously reconstructed image samples;
generate latent representation samples of the image by processing a second coded bitstream of the coded bitstream and a set of entropy parameters generated from the set of hyper data items and the set of contextual parameters; and
reconstruct image samples from the latent representation sample of the image by a core decoder of the decoder, wherein the core decoder comprises a neural network with three or fewer upsampling stages.

18. The decoder of claim 17, comprising three upsampling stages, each sequential pair of the three upsampling stages are connected via at least a cropping neural network layer and an activation neural network layer.

19. The decoder of claim 17, comprising at least two upsampling stages and a sequentially first upsampling stage is directly connected to an entropy decoded data items from the coded bitstream.

20. A non-transitory computer readable storage medium for storing instructions, the instructions, when executed by at least one processor, are configured to cause the at least one processor to:
generate a set of hyper data items from a first coded bitstream of an image by a hyper decoder of the decoder;
generate a set of contextual parameters by a context model of the decoder based on previously reconstructed image samples;
generate latent representation samples of the image by processing a second coded bitstream and a set of entropy parameters generated from the set of hyper data items and the set of contextual parameters; and
reconstruct image samples from the latent representation sample of the image by a core decoder of the decoder, wherein the core decoder comprises a neural network with three or fewer upsampling stages.

* * * * *